US011947456B2

United States Patent
Moyer (10) Patent No.: US 11,947,456 B2
(45) Date of Patent: Apr. 2, 2024

(54) WEAK CACHE LINE INVALIDATION REQUESTS FOR SPECULATIVELY EXECUTING INSTRUCTIONS

(71) Applicant: Advanced Micro Devices, Inc., Santa Clara, CA (US)

(72) Inventor: Paul J. Moyer, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/490,910

(22) Filed: Sep. 30, 2021

(65) Prior Publication Data

US 2023/0101748 A1    Mar. 30, 2023

(51) Int. Cl.
*G06F 12/00* (2006.01)
*G06F 12/0808* (2016.01)
*G06F 12/0811* (2016.01)
*G06F 12/0875* (2016.01)

(52) U.S. Cl.
CPC ...... *G06F 12/0811* (2013.01); *G06F 12/0808* (2013.01); *G06F 12/0875* (2013.01)

(58) Field of Classification Search
CPC ...... G06F 12/12; G06F 12/121; G06F 12/122; G06F 12/123; G06F 12/124; G06F 12/125; G06F 12/126; G06F 12/127; G06F 12/128
See application file for complete search history.

(56) References Cited

U.S. PATENT DOCUMENTS

| | | | |
|---|---|---|---|
| 6,526,480 B1 | 2/2003 | Naruse et al. | |
| 6,725,337 B1* | 4/2004 | Tan | G06F 12/0891 711/144 |
| 10,394,716 B1* | 8/2019 | Piry | G06F 12/0871 |
| 2002/0152359 A1* | 10/2002 | Chaudhry | G06F 12/0808 711/141 |
| 2002/0199066 A1* | 12/2002 | Chaudhry | G06F 12/0822 711/5 |
| 2003/0195939 A1 | 10/2003 | Edirisooriya et al. | |
| 2007/0186053 A1* | 8/2007 | Chaudhry | G06F 9/3863 712/E9.05 |
| 2011/0138126 A1 | 6/2011 | Blundell et al. | |
| 2013/0254486 A1* | 9/2013 | McCormick, Jr. | G06F 12/0855 711/125 |
| 2017/0262369 A1 | 9/2017 | Murphy | |
| 2018/0196751 A1 | 7/2018 | Giamei et al. | |

* cited by examiner

*Primary Examiner* — Arvind Talukdar
(74) *Attorney, Agent, or Firm* — Volpe Koenig (57) ABSTRACT

Techniques for invalidating cache lines are provided. The techniques include issuing, to a first level of a memory hierarchy, a weak exclusive read request for a speculatively executing store instruction; determining whether to invalidate one or more cache lines associated with the store instruction in one or more memories; and issuing the weak invalidation request to additional levels of the memory hierarchy.

18 Claims, 6 Drawing Sheets

WEAK CACHE LINE INVALIDATION REQUESTS FOR SPECULATIVELY EXECUTING INSTRUCTIONS

BACKGROUND

Modern microprocessors implement a wide array of features for high throughput. Some such features include having highly parallel architectures and performing execution speculatively. Improvements to such features are constantly being made.

BRIEF DESCRIPTION OF THE DRAWINGS

A more detailed understanding may be had from the following description, given by way of example in conjunction with the accompanying drawings wherein.

DETAILED DESCRIPTION

Techniques for invalidating cache lines are provided. The techniques include issuing, to a first level of a memory hierarchy, a weak exclusive read request for a speculatively executing store instruction; determining whether to invalidate one or more cache lines associated with the store instruction in one or more memories; and issuing the weak invalidation request to additional levels of the memory hierarchy.

Figure 1:
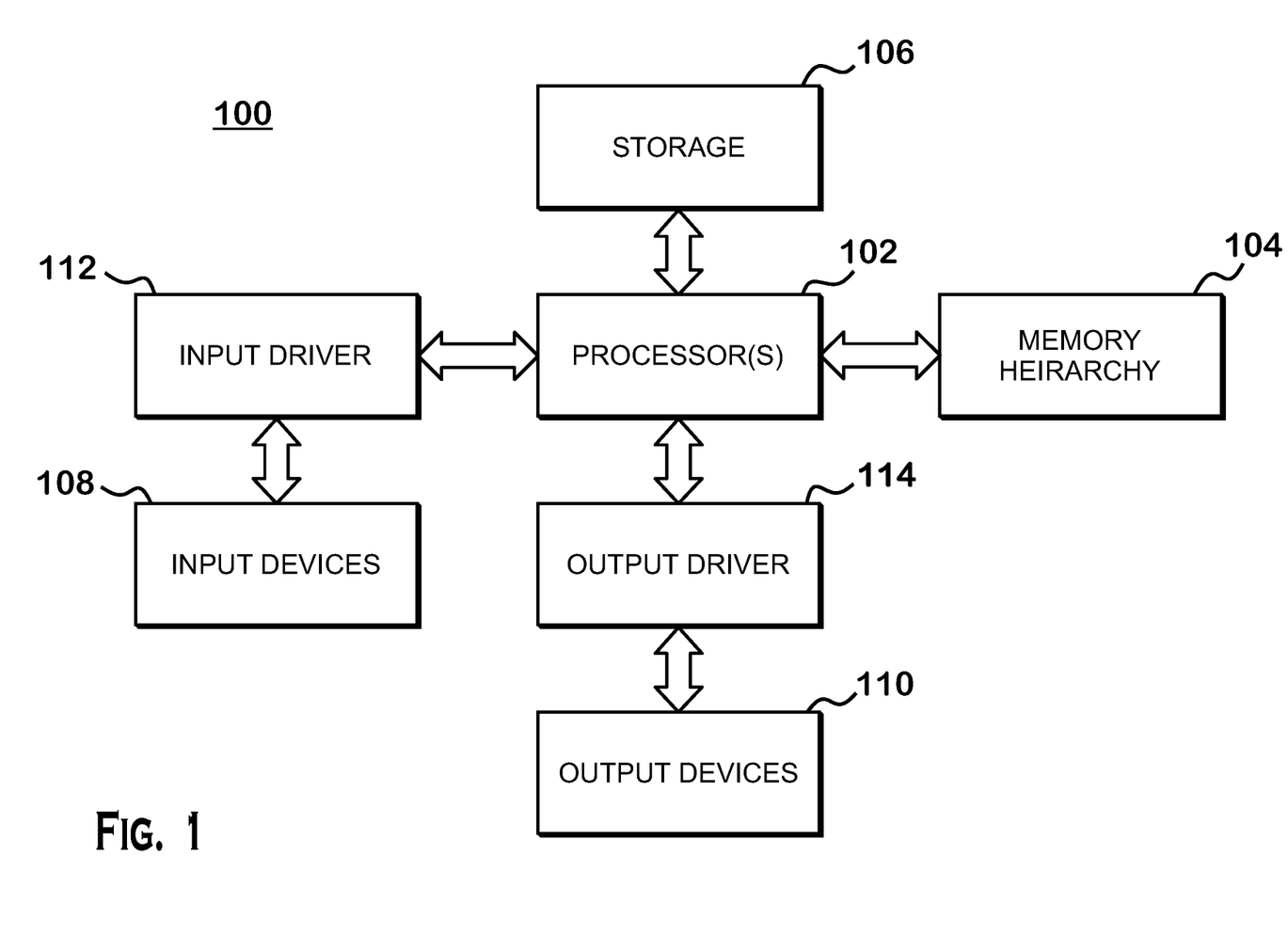
FIG. 1 is a block diagram of an example device in which one or more disclosed embodiments may be implemented.

FIG. 1 is a block diagram of an example device 100 in which aspects of the present disclosure are implemented. The device 100 includes, for example, a computer, a gaming device, a handheld device, a set-top box, a television, a mobile phone, or a tablet computer. The device 100 includes one or more processors 102, a memory hierarchy 104, a storage device 106, one or more input devices 108, and one or more output devices 110. The device 100 may also optionally include an input driver 112 and an output driver 114. It is understood that the device 100 may include additional components not shown in FIG. 1.

The one or more processors 102 includes a central processing unit (CPU), a graphics processing unit (GPU), a CPU and GPU located on the same die, or one or more processor cores, wherein each processor core is a CPU or a GPU. In some examples, the one or more processors 102 includes any number of processors. In some examples, the one or more processors 102 includes one or more processor chips. In some examples, each processor chips includes one or more processor cores.

Part or all of the memory hierarchy 104 may be located on the same die as one or more of the one or more processors 102, or may be located partially or completely separately from the one or more processors 102. The memory hierarchy 104 includes, for example, one or more caches, one or more volatile memories, one or more non-volatile memories, and/or other memories, and may include one or more random access memories ("RAM") of one or a variety of types.

In some examples, the elements of the memory hierarchy 104 are arranged in a hierarchy that includes the elements of the one or more processors 102. Examples of such an arrangement is provided in FIGS. 3 and 4.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
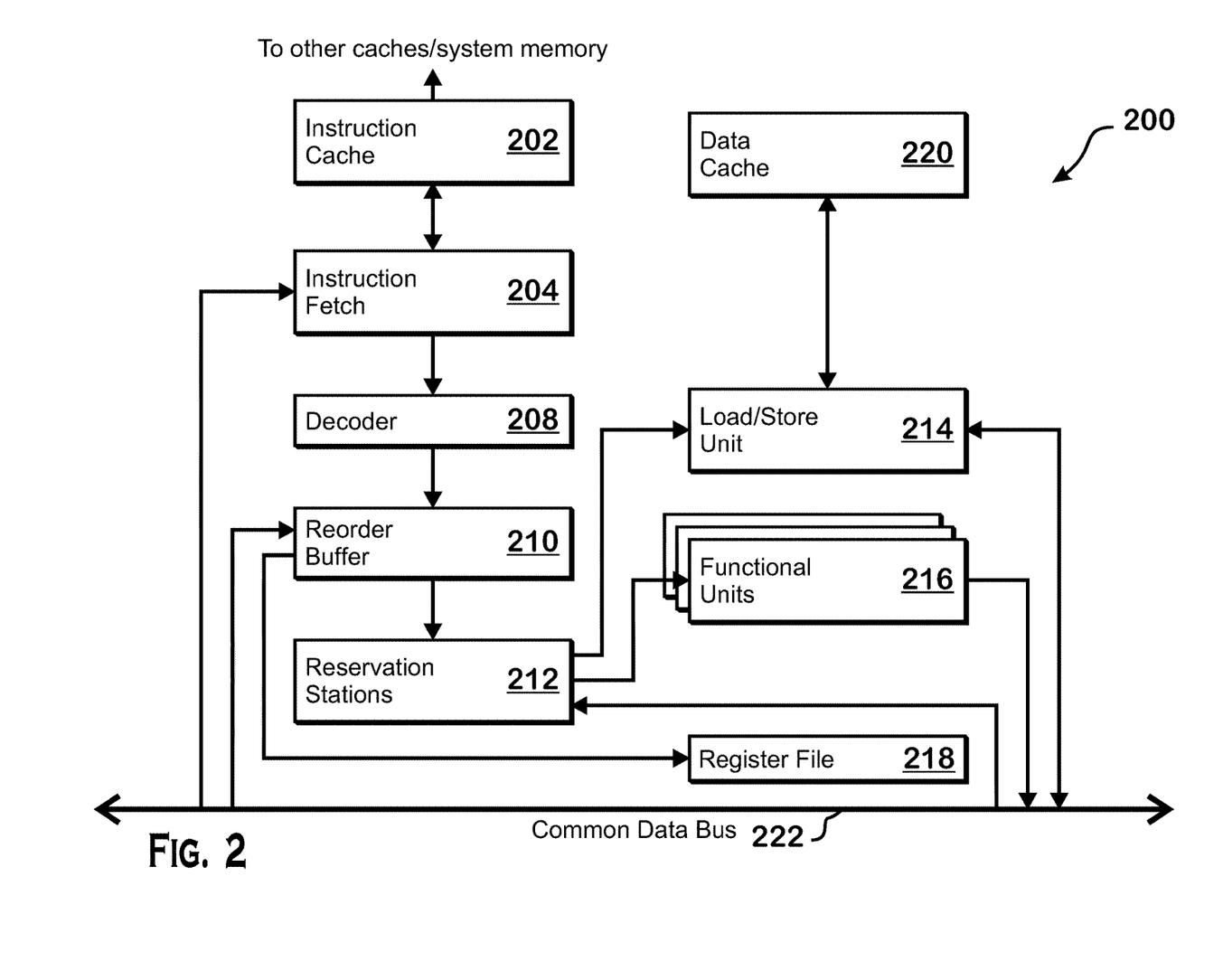
FIG. 2 is a block diagram of an instruction execution pipeline, located within the processor of FIG. 1.

FIG. 2 is a block diagram of an instruction execution pipeline 200, located within the one or more processors 102 of FIG. 1. In various examples, any of the processor cores of the one or more processors 102 of FIG. 1 are implemented as illustrated in FIG. 2.

The instruction execution pipeline 200 retrieves instructions from memory and executes the instructions, outputting data to memory and modifying the state of elements within the instruction execution pipeline 200, such as registers within register file 218.

The instruction execution pipeline 200 includes an instruction fetch unit 204 configured to fetch instructions from system memory (such as memory 104) via an instruction cache 202, a decoder 208 configured to decode fetched instructions, functional units 216 configured to perform calculations to process the instructions, a load store unit 214, configured to load data from or store data to system memory via a data cache 220, and a register file 218, which includes registers that store working data for the instructions. A reorder buffer 210 tracks instructions that are currently in-flight and ensures in-order retirement of instructions despite allowing out-of-order execution while in-flight. "In-flight" instructions refers to instructions that have been received by the reorder buffer 210 but have not yet had results committed to the architectural state of the processor (e.g., results written to a register file, or the like). Reservation stations 212 maintain in-flight instructions and track instruction operands. When all operands are ready for execution of a particular instruction, reservation stations 212 send the instruction to a functional unit 216 or a load/store unit 214 for execution. Completed instructions are marked for retirement in the reorder buffer 210 and are retired when at the head of the reorder buffer queue 210. Retirement refers to the act of committing results of an instruction to the architectural state of the processor. For example, writing an addition result to a register, by an add instruction, writing a loaded value to a register by a load instruction, or causing instruction flow to jump to a new location, by a branch instruction, are all examples of retirement of the instruction.

Various elements of the instruction execution pipeline 200 communicate via a common data bus 222. For example, the functional units 216 and load/store unit 214 write results to the common data bus 222 which may be read by reservation stations 212 for execution of dependent instructions and by the reorder buffer 210 as the final processing result of an in-flight instruction that has finished execution. The load/store unit 214 also reads data from the common data bus 222. For example, the load/store unit 214 reads results from completed instructions from the common data bus 222 and writes the results to memory via the data cache 220 for store instructions.

The instruction execution pipeline 200 executes some instructions speculatively. Speculative execution means that the instruction execution pipeline 200 performs at least some operations for execution of the instruction, but maintains the ability to reverse the effects of such execution in the event that the instruction was executed incorrectly.

In an example, the instruction execution pipeline 200 is capable of performing branch prediction. Branch prediction is an operation in which the instruction fetch unit 204 predicts the control flow path that execution will flow to and fetches instructions from that path. There are many ways to make the prediction, and some involve maintaining global or address-specific branch path histories (e.g., histories of whether branches are taken or not taken and/or the targets of such branches), and performing various operations with such histories. The execution pipeline (e.g., the functional units 216) actually executes branches to determine the correct results of such branches. While instructions from the predicted execution path are executing but before the functional units 216 actually determines the correct execution path, such instructions are considered to be executing speculatively, because it is possible that such instructions should not actually be executed. There are many other reasons why instructions could execute speculatively.

It is possible to execute store instructions speculatively. Speculative execution occurs by performing various operations for an instruction but not committing such operations until the instruction becomes non-speculative. In an example, executing a store instruction speculatively includes placing the instruction into a load/store unit 214, determining the data to store, determining an address to store the data to (which may involve address calculation and translation). During this time, the reorder buffer 210 holds the store instruction and does not permit the instruction to retire—commit the results—until the store instruction becomes non-speculatively executing.

Instructions could execute speculatively for a variety of reasons such as executing in a predicted branch control flow path or for a variety of other reasons. Part of the execution of a store instruction involves writing the data to be stored into a cache. To do this, a cache controller gains exclusive access to the appropriate cache line and then writes the specified data into that cache line. Gaining exclusive access to the appropriate cache line involves causing other caches (e.g., all other caches) to invalidate their copies of the cache line. Doing this prevents conflicting versions of data for that cache line from existing in different cache memories. In the MESI ("modified, exclusive, shared, invalid") protocol, the instruction execution pipeline 200 that executes the store gains exclusive access to the cache line and the other units set their copy of the cache line to be invalid.

The instruction execution pipeline 200 is an out-of-order execution pipeline that attempts to perform various operations for instructions early. One example of such an operation is the invalidation described above. Specifically, for execution of a store instruction, the instruction execution pipeline 200 is permitted to, and often does, request invalidation of other memories' copies of the cache line early on in the execution of a store instruction, so that when the store instruction is ready to write the associated data, the instruction execution pipeline 200 does not need to wait as long as if the invalidation were to occur at a later time. An issue arises, however, where speculative execution of a store instruction occurs. Specifically, as described above, it is possible for the instruction execution pipeline 200 to request invalidation of cache lines for speculatively executing store instruction, and to make such request substantially before the store instruction is ready to write data. However, it is possible that the speculative execution of the store instruction is actually incorrect. For example, it is possible that the store instruction was executing on an incorrectly predicted control flow path (such as past the branch not-taken point where the branch is actually taken). In this case, the act of causing the various copies of the cache line involved to be invalidated from the various memories is wasted, and those various memories may need to reacquire those cache lines in shared or exclusive state.

For at least this reason, an operation referred to as "weak exclusive read request" is described herein. The weak exclusive read request is a request to invalidate cache lines, but it is possible for various memories or memory controllers to refuse to perform the invalidation. It is possible for the various memories or memory controllers to take various factors into account in determining whether to perform the requested validation. Some examples of such factors include the number of memories in which the cache line resides and thus for which the cache line is to be invalidated, and the "cost" for performing invalidation, where the cost represents the degree of additional work that is to be performed to reacquire the cache line, which is wasted if the store instruction is incorrectly executed speculatively. Some example measures of cost include latency to re-obtain the cache line, the latency or bandwidth limitations of the invalidation messages, or other factors. The weak exclusive read request is contrasted with a strong exclusive read request, which all memories do obey. In some examples, the strong exclusive read request occurs for store instructions that are not executing speculatively and for store instructions that were executing speculatively but that become non-speculatively executing (such as where it is confirmed that the predicted control flow path after a branch is determined to be the correct control flow path). In sum, in some instances, where the instruction execution pipeline 200 executes a store instruction speculatively, the instruction execution pipeline 200 issues a weak exclusive read request to various memories that include the cache line that the store instruction is writing to. Any or all of the various memories obey or do not obey the weak exclusive read request, based on one or more factors. At a later time, such as when execution of the store instruction becomes no longer speculative, the instruction execution pipeline 200 issues a strong exclusive read request, causing the memories that store the cache line to invalidate that cache line so that the instruction execution pipeline 200 executing the store instruction can gain the cache line in an exclusive state to write the appropriate data. Additional details are now provided.

Figure 3:
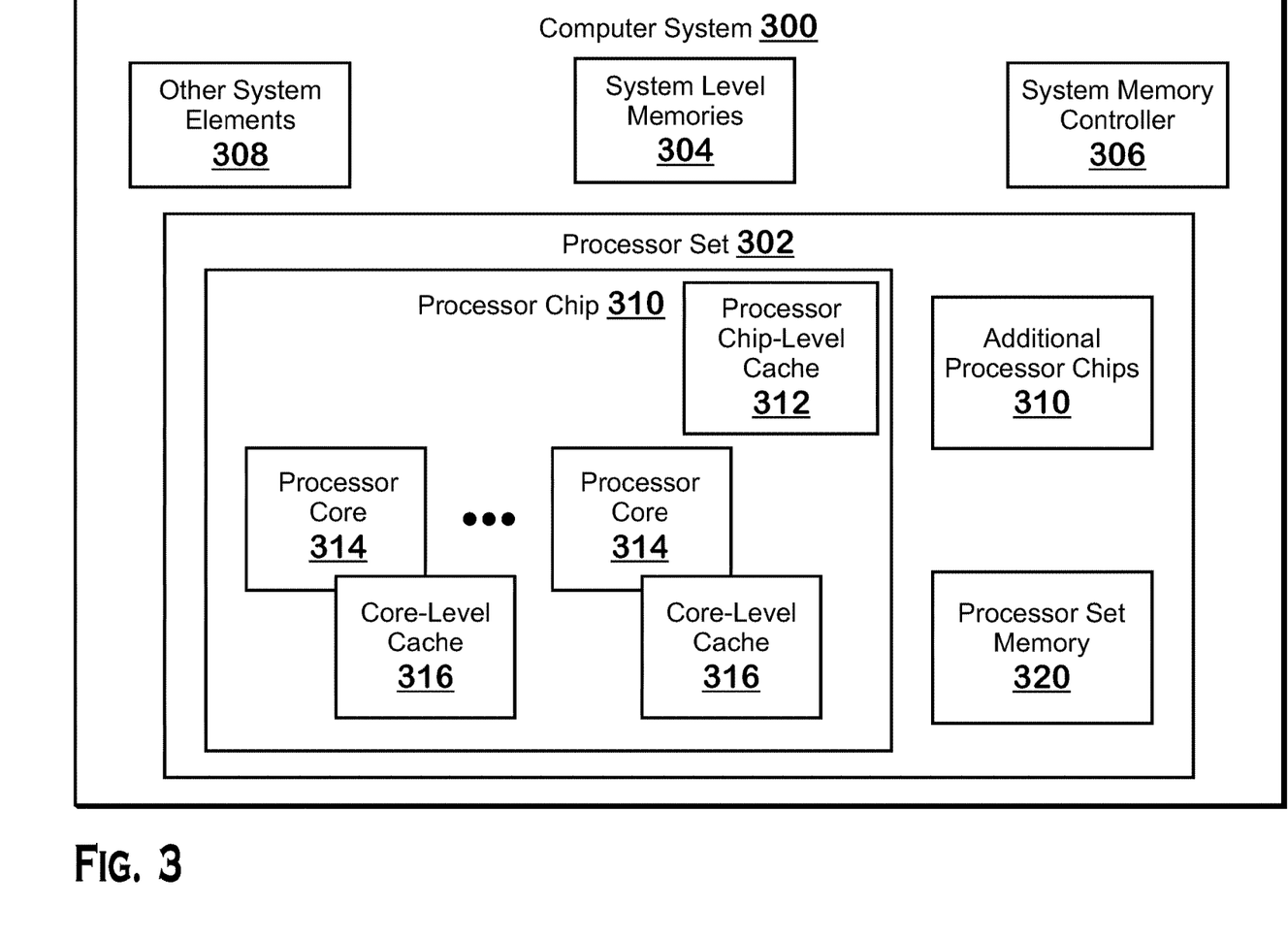
FIG. 3 is a block diagram of a computer system, according to an example.

FIG. 3 is a block diagram of a computer system 300, according to an example. In some examples, the computer system 300 is the computer system 100 of FIG. 1. The computer system 300 includes a processor set 302, one or more system-level memories 304, a system memory controller 306, and other system elements 308.

The processor set 302 includes one or more processor chips 310. Each processor chip 310 includes a processor chip-level cache 312 and one or more processor cores 314. Each processor core 314 has an associated core-level cache 316. Each of the processor cores 314 includes one or more execution pipelines such as the instruction execution pipeline 200 of FIG. 2.

The caches and memories illustrated in FIG. 3 operate in parallel and therefore use a coherence protocol to ensure data coherence. One example of such a protocol is the modified-exclusive-shared-invalid ("MESI") protocol. Each cache line includes an indication of one of these four states. The modified state indicates that the copy of the cache line stored in a particular cache is modified with respect to the copy stored in a backing memory, and thus that the cache line must be written to the backing memory when the cache line is evicted. The exclusive state indicates that the cache line is stored in a particular cache and not in any other cache at the same level of the hierarchy. It should be noted that a cache line that is marked as exclusive can be stored in a higher level of the hierarchy. For example, a cache line stored in a level 0 cache in an exclusive state can also be stored in the level 1 cache directly above the level 0 cache. The shared state indicates that the cache line is stored in multiple caches at the same level of the hierarchy. The invalid state indicates that the cache line is not valid within the particular cache where that cache line is marked invalid (although another cache can store a valid copy of that cache line).

Each processor core 314 has an associated core-level cache 316. When a processor core 314 executes a memory operation such as a load operation or a store operation, the processor core 314 determines whether the cache line that stores the data for the memory operation is located within the core-level cache 316 associated with the processor core 314. If such cache line is not located within the core-level cache 316, then the core-level cache 316 attempts to fetch that cache line into that core-level cache 316 from a higher level cache such as the processor chip-level cache 312. The processor chip-level cache 312 serves both as a higher level cache memory and as a controller that manages the coherence protocol for the processor chip-level cache 312 and all core-level caches 316 within the same processor chip 310. Thus the processor chip-level cache 312 checks itself to determine whether the requested cache line is stored therein for the purpose of providing that cache line to the requesting processor core 314. The processor chip-level cache 312 provides the cache line to the requesting core 314 either from its own contents or once fetched from a memory that is higher up in the hierarchy.

The processor chip-level cache 312 manages the coherence protocol for the core-level caches 316. In general, the processor chip-level cache 312 manages the protocol states of the cache lines within the core-level caches 316 so that if any cache line is in an exclusive state in a particular core-level cache 316, no other core-level cache 316 has that cache line in any state except invalid. Multiple core-level caches 316 are permitted to have the cache line in a shared state.

The protocol works on a level-by-level basis. More specifically, at each level of the memory hierarchy, each element within that level is permitted to have a cache line in some subset of the states of the protocol. In an example, at the level of the processor set 302, each chip 310 (thus, each processor chip-level cache 312) is permitted to have a cache line in one of the states, such as a shared state or an exclusive state. A controller for a particular level of the hierarchy manages the protocol at that level. Thus the processor set memory 320 manages the states of the processor chip-level caches 312. The processor chip-level cache 312 for any particular processor chip 310 manages the states of the core-level caches 316, and a system memory controller 306 manages the states for the processor set 302 and other system elements 308 that may store a particular cache line.

When a processor core 314 executes a store instruction, the processor core 314 requests that the cache line that includes the data to be written to is placed into the associated core-level cache 316 in an exclusive state. Part of satisfying this request involves requesting that the all other caches (other than the caches "directly above" the core-level cache 316) invalidate their copy of that cache line. In the event that the store instruction is executing speculatively, the core-level cache 316 issues a weak exclusive read. Each cache is permitted to ignore this weak exclusive read and thus not invalidate their copy of the cache line. As stated elsewhere, when the store instruction is no longer executing speculatively, the processor core 314 issues a strong exclusive read, and the other caches invalidate their copies in response to that strong exclusive read.

In some implementations, the weak exclusive read is processed individually by different levels of the memory hierarchy. More specifically, the weak exclusive read propagates up through the hierarchy and at each level, the controller for that level (e.g., the processor chip-level cache 312, the processor set memory 320, or the system memory controller 306) makes the determination regarding whether to satisfy or not to satisfy the request, for the memories within that hierarchy. The controller then controls those memories to satisfy the request, or not to satisfy the request, based on the determination. Because each level is able to determine whether to satisfy this request individually, it is possible for memories of one level to satisfy the request by invalidating the appropriate cache line while memories of a different level do not invalidate the appropriate cache line. In an example, the core-level caches 316 of the same processor chip 310 as the requesting core 314 invalidate their cache lines, but none of the core-level caches 316 of the other processor chips 310 invalidate their cache lines, and none of the other system elements 308 invalidate their cache lines.

Figure 4:
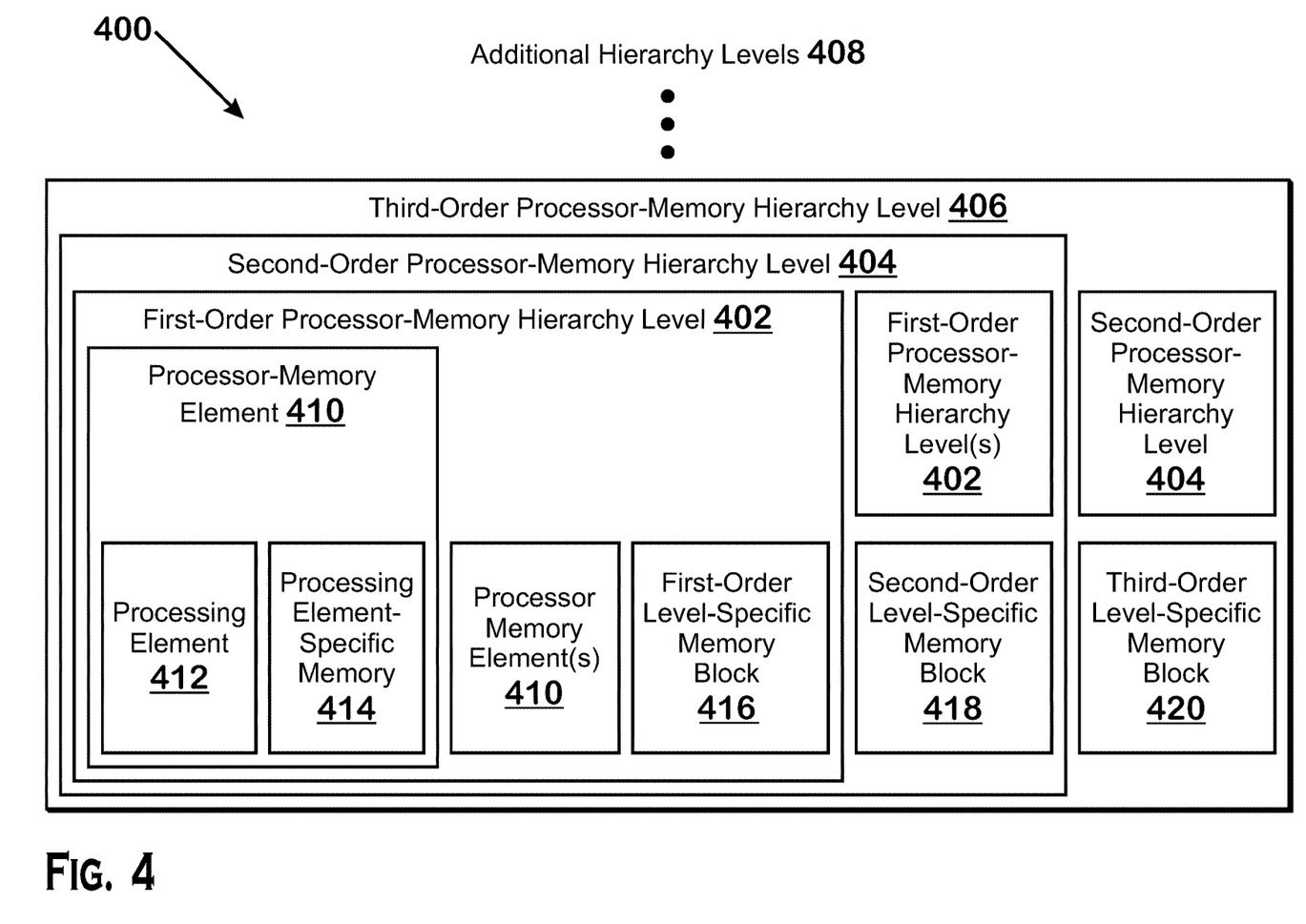
FIG. 4 is a block diagram of a computer system capable of executing a weak exclusive read, according to another example.

FIG. 4 is a block diagram of a computer system 400 capable of executing a weak exclusive read, according to another example. The system 400 includes one or more lowest levels of the hierarchy (first-order processor-memory hierarchy level 402), one or more next-level-up second-order processor-memory hierarchy levels 404, arranged in a hierarchy, one or more third-order processor-memory hierarchy levels 406, and, optionally, additional hierarchy levels 408 not shown.

At the lowest level—the first-order processor-memory hierarchy level 402 includes one or more of the processor-memory elements 410. Each processor-memory element 410 includes a processing element 412 and a processing element-specific memory 414. The processing elements 412, in the course of executing software, speculatively execute store instructions and issue corresponding weak exclusive read operations. The processing elements 412 also issue strong exclusive read operations in the event that the store instructions are not executing speculatively.

Each level of the hierarchy includes a level-specific memory (e.g., first-order memory 416, second-order memory 418, and third-order memory 420) that determines how to respond to the weak exclusive read operation. As stated elsewhere herein, the memory for each level is permitted to either execute or decline (where in some implementations, "decline" means not executing the weak exclusive read operation and informing the requestor of such declining to execute) the weak exclusive read operation by invalidating the corresponding cache lines of the "children" of that level-specific memory or not invalidating those cache lines, based on a determination taking into factors such as how many memories store the cache line in a valid state when the request is received, what the "cost" would be for invalidating a cache line in a particular memory, and/or other factors.

The system 300 of FIG. 3 is an example of the system 400 of FIG. 4. Thus, while FIG. 3 shows specific types of hierarchy level elements such as cores, chips, and the like, the hierarchy levels of FIG. 4 do not necessarily include similar elements or groupings of elements. The processing elements 412 are sets of one or more processors like a processor core or group of processor cores, and each memory hierarchy level is a hierarchical grouping of such processors.

The system 300 of FIG. 3 is an example of the system 400 of FIG. 4. The processor cores 314 are an example of the processing elements 412. The core-level caches 316 are examples of the processing element-specific memory 414. The processor chips 310 are examples of the first-order processor memory hierarchy levels 402, and the processor chip-level cache 312 is an example of the first-order level-specific memory block 416. The processor set 302 is an example of the second-order processor-memory hierarchy level 404 and the processor set memory 320 is an example of the second-order level-specific memory block 418. The computer system 300 is an example of the third-order processor-memory hierarchy level 406, and the system memory controller 306 is an example of the third-order level-specific memory block 420, along with internal memories of the other system elements 308 and the processor set 302. Additional hierarchy levels 408 could correspond to additional computer systems that are networked to the computer system 300. It should of course be understood that although the system 300 of FIG. 3 is an example of the system 400 of FIG. 4, the system 400 of FIG. 4 is not limited to any particular detail of the system 300 of FIG. 3.

Figure 5:
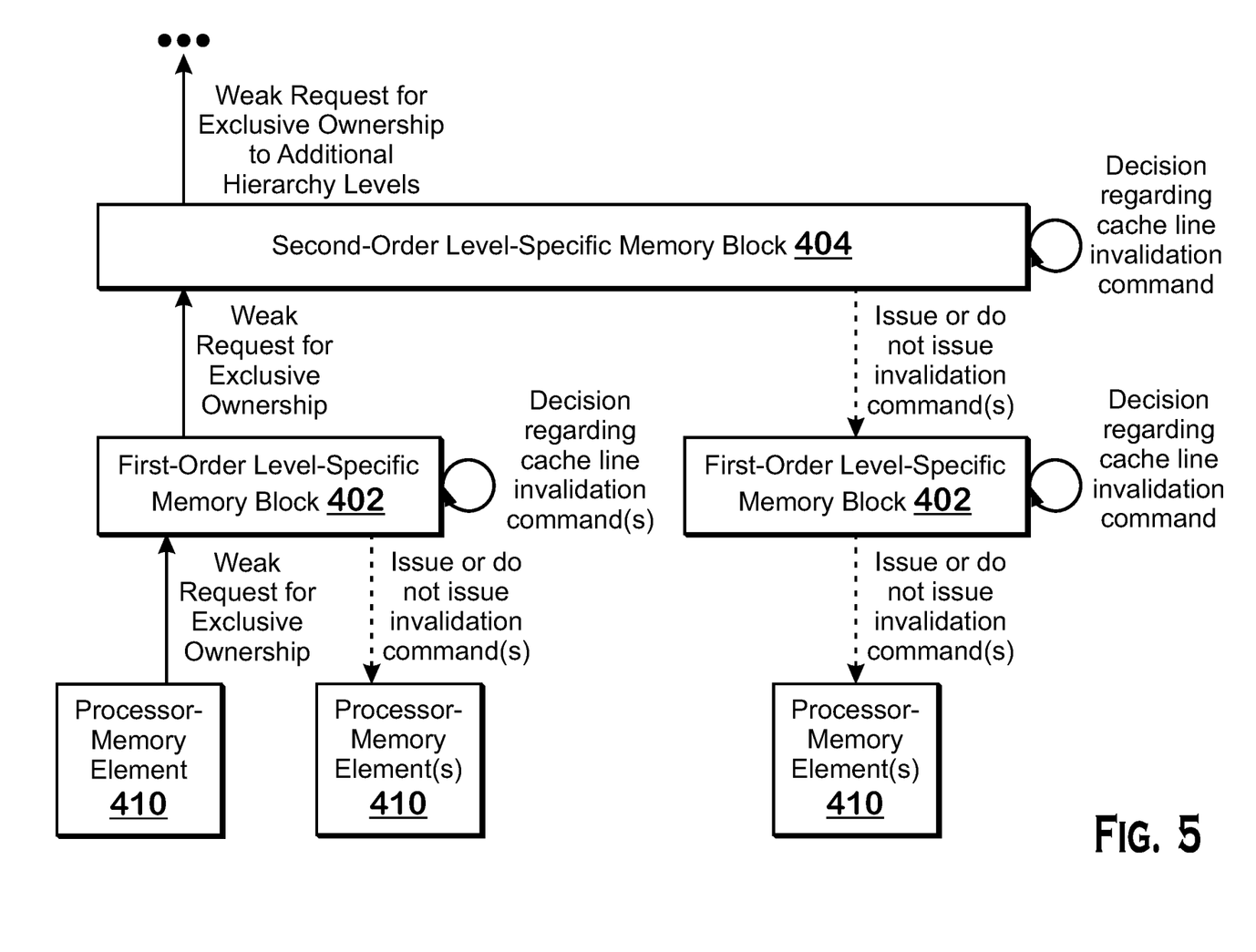
FIG. 5 is a diagram illustrating operations for a weak exclusive read operation, according to an example.

FIG. 5 is a diagram illustrating operations for a weak exclusive read operation, according to an example. The processor-memory element 410 in the bottom-left of the Figure speculatively executes a store instruction and thus issues a weak request for exclusive ownership to the first-order level-specific memory block 402. The first-order level-specific memory block 402 makes a decision regarding whether to instruct other processor memory elements 410 under the command of the first-order level-specific memory block 402 to invalidate the cache lines. It is possible for the first-order level-specific memory block 402 (or any memory block) to differently determine that any of the elements under its direct command (e.g., processor memory elements 410 for first-order level-specific memory block 402, first-order processor-memory hierarchy level 402 for the second-order level-specific memory block 418, second-order processor-memory hierarchy level 404 for the third-order level-specific memory block 420, and the like) should or should not invalidate the cache line in question. For example, it is possible for the first-order level-specific memory block 402 to determine that one processing element-specific memory 414 should invalidate its copy of the cache line, while another processing element-specific memory 414 should not invalidate its copy of the cache line. A unit makes this determination in any technically feasible manner, such as, for example, by taking certain performance factors into account such as the amount of work or time required to re-acquire the cache line, the number of elements under direct command that actually store the cache line, or other factors. It is also possible for a memory block at any level (e.g., second-order level-specific memory block 404) to individually make these determinations.

In addition, because gaining exclusive access includes only a single copy of that cache line in any lowest-level cache, the first-order level-specific memory block 402 sends another request up the hierarchy for further distribution. Specifically, the first-order level-specific memory block 402 sends the weak request to a second-order level-specific memory block 404 for exclusive ownership. The second-order level-specific memory block 404 makes a determination regarding whether to issue a cache line invalidation command to any of the one or more first-order level-specific memory blocks 402 under the direct command of the second-order level-specific memory block 404, based on any of a variety of factors, such as those discussed elsewhere herein, and sends or does not send such commands. The second-order level-specific memory block 404 also sends the weak request for exclusive ownership to additional hierarchy levels (e.g., third level) in a similar manner. When a level-specific memory block that receives a weak request for exclusive ownership from a higher block in the hierarchy, the level-specific memory block determines whether to issue such an invalidation command to the block (processor memory element 410 or level-specific memory block) based on the factors described herein.

Figure 6:
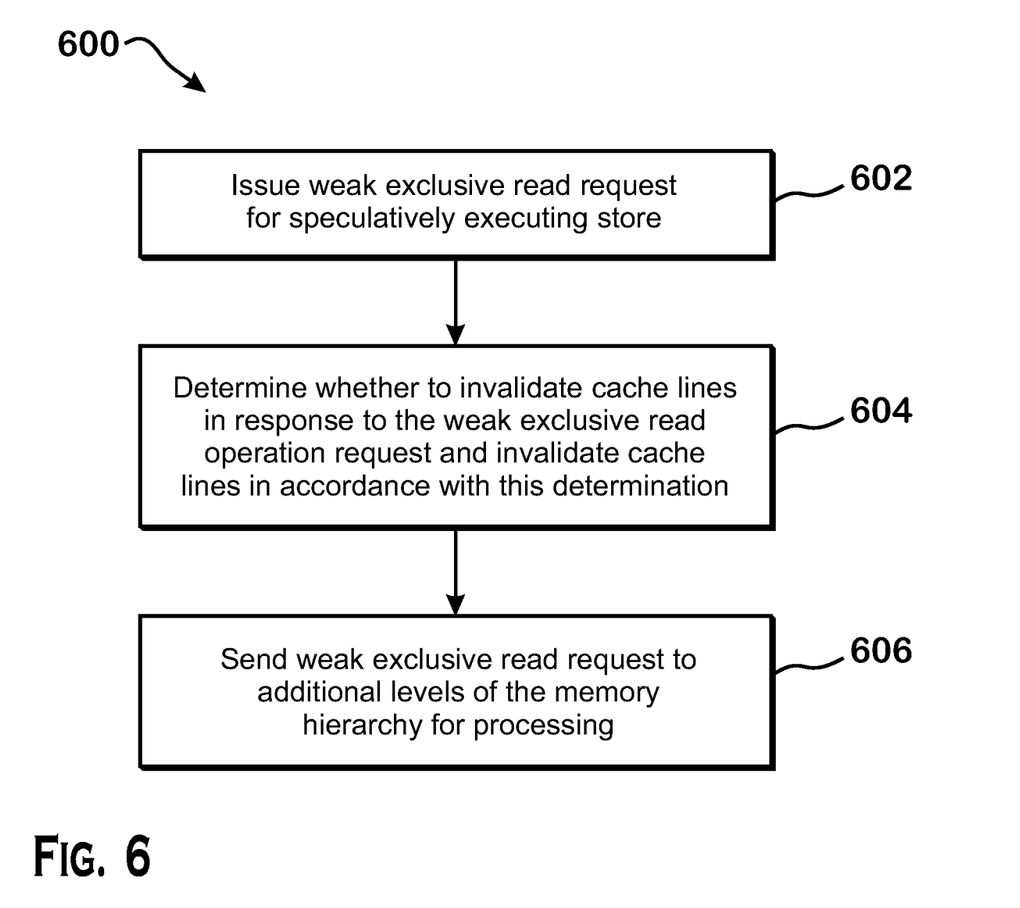
FIG. 6 is a flow diagram of a method for executing a weak exclusive read operation, according to an example.

FIG. 6 is a flow diagram of a method 600 for executing a weak exclusive read operation, according to an example. Although described with respect to the systems of FIGS. 1-5, those of skill in the art will understand that any system, configured to perform the steps of the method 600 in any technically feasible order, falls within the scope of the present disclosure.

At step 602, a processing element 412 issues a weak exclusive read request to a memory block such as the first-order level-specific memory block 402. In some examples, the processing element 412 issues the weak exclusive read operation in response to or in the course of speculatively executing a store instruction. At step 604, the first-order level-specific memory block 402, which in some examples, is a cache that is shared between processor cores, makes a determination regarding whether to issue or not issue a command to invalidate the cache line including that address that the store instruction is to store to, to the processor-memory elements 410 under the direct command of the first-order level-specific memory block 402. The processor-memory elements 410 obey these commands, invalidating the cache lines specified by the commands. At step 606, the first-order level-specific memory block 402 sends the weak exclusive read request to higher levels of the memory hierarchy for processing as described elsewhere herein.

In some examples, in response to the store instruction becoming non-speculative, the processing element 412 executing the storing instruction issues a strong exclusive read request to the memory hierarchy. In response to this request, each cache that stores a copy of the cache line that is not in the portions of the memory hierarchy directly above the processing element 412 invalidates the cache line. In an example, the portions of the memory hierarchy directly above the processing element 412 includes the L0 cache associated with the processing element 412, the L1 cache directly above that L0 cache, the L2 cache directly above that L1 cache, and so on. These memories do not invalidate their copies of the cache line because the purpose of the invalidation is to invalidate parallel copies, not directly-used copies of the cache line.

If the processing element 412 determines that the speculatively executing store instruction does not become non-speculatively executing—in other words, that execution of the store instruction is incorrect (e.g., due to a branch misprediction)—then the processing element 412 does not issue the strong exclusive read request. In this instance, the memories that did not invalidate the cache line did not have to reacquire the cache line where execution of the store instruction was incorrect.

It should be understood that, in each of the memories described herein, the invalidation to occur occurs for the cache line that includes the data to which the store instruction will write.

It should be understood that many variations are possible based on the disclosure herein. Although features and elements are described above in particular combinations, each feature or element may be used alone without the other features and elements or in various combinations with or without other features and elements.

The various elements illustrated in the Figures are implementable as hardware (e.g., circuitry), software executing on a processor, or a combination of hardware and software. In various examples, each block, such as the processor-memory elements 410, the processing elements 412, the memories 414, memories 416, memories 418, the processor chips 310, the system elements 308, system level memories 304, system memory controller 306, and the illustrated units of the instruction execution pipeline 200 and the computer system 100, are implementable as hardware, software, or a combination thereof. The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method, comprising:
   receiving, by a first controller of a first level of a multi-level memory hierarchy, a weak exclusive read request for a speculatively executing store instruction;
   processing, by the first controller, the weak exclusive read request, by determining whether to invalidate one or more cache lines associated with the store instruction in one or more memories of the first level of the multi-level memory hierarchy; and
   issuing, by the first controller, the weak exclusive read request to a second controller of a second level of the multi-level memory hierarchy, configured to process the weak exclusive read request.

2. The method of claim 1, wherein the one or more cache lines include a particular cache line associated with the store instruction.

3. The method of claim 1, wherein the second level of the multi-level memory hierarchy is higher level than the first level of the multi-level memory hierarchy.

4. The method of claim 1, wherein:
   the second controller is configured to process the weak exclusive read request by invalidating one or more cache lines associated with the store instruction in the one or more memories of the second level of the multi-level memory hierarchy.

5. The method of claim 1, wherein the first controller is configured to process the weak exclusive request by invalidating the one or more cache lines.

6. The method of claim 1, further comprising:
   in response to the store instruction becoming non-speculative, receiving, by the first controller, a strong exclusive read request.

7. The method of claim 1, further comprising:
   receiving, by the first controller, a strong exclusive read request for a second instruction, wherein the second instruction is executed non-speculatively.

8. The method of claim 1, wherein:
   the one or more cache lines are invalidated based on one or more of a number of memories at the first level of the multi-level memory hierarchy or a cost associated with invalidating the one or more cache lines.

9. A device, comprising:
   a first level of a multi-level memory hierarchy; and
   a first controller of the first level of the multi-level memory hierarchy;
   wherein the first controller of the first level of the multi-level memory hierarchy is configured to:
   receive a weak exclusive read request for a speculatively executing store instruction;
   process, by the first controller, the weak exclusive read request, by determining whether to invalidate one or more cache lines associated with the store instruction in one or more memories of the first level of the multi-level memory hierarchy; and
   issue the weak exclusive read request to a second controller of a second level of the multi-level memory hierarchy, wherein the second controller is configured to process the weak exclusive read request.

10. The device of claim 9, wherein the one or more cache lines include a particular cache line associated with the store instruction.

11. The device of claim 9, wherein the second level of the multi-level memory hierarchy is higher level than the first level of the multi-level memory hierarchy.

12. The device of claim 9, wherein the second controller is further configured to:
   process the exclusive read request by invalidating one or more cache lines associated with the store instruction in the one or more memories of the second level of the multi-level memory hierarchy.

13. The device of claim 9, the wherein the first controller is configured to process the weak exclusive read request by invalidating the one or more cache lines.

14. The device of claim 9, wherein the first controller is further configured to:

receive a strong exclusive read request in response to the store instruction becoming non-speculative.

15. The device of claim 9, wherein the first controller is further configured to:

receive a strong exclusive read request for a second instruction, wherein the second instruction is executed non-speculatively.

16. The device of claim 9, wherein:

the one or more cache lines are invalidated based on one or more of a number of memories at the first level of the multi-level memory hierarchy or a cost associated with invalidating the one or more cache lines.

17. A device, comprising:

a processor memory hierarchy that includes a plurality of memory hierarchy levels, where each memory hierarchy level includes a processing element;

wherein a first processing element of a first memory hierarchy level among the plurality of memory hierarchy levels is configured to:

receive a weak exclusive read request for a speculatively executing store instruction, process the weak exclusive read request, by determining whether to invalidate one or more cache lines associated with the store instruction in one or more memories of the first memory hierarchy level; and issue the weak exclusive read request to a second processing element of a second level of the processor memory hierarchy, wherein the second processing element refuses to perform the weak exclusive read request.

18. The device of claim 17, wherein the one or more cache lines include a particular cache line associated with the store instruction.

* * * * *